United States Patent [19]

Shull et al.

[11] 3,851,272
[45] Nov. 26, 1974

[54] GASEOUS LASER WITH CATHODE FORMING OPTICAL RESONATOR SUPPORT AND PLASMA TUBE ENVELOPE

[75] Inventors: William A. Shull, Portola Valley; Gerald C. Barker, Palo Alto, both of Calif.

[73] Assignee: Coherent Radiation, Palo Alto, Calif.

[22] Filed: Jan. 2, 1973

[21] Appl. No.: 320,093

[52] U.S. Cl.............. 331/94.5, 313/201, 313/204, 313/220, 313/217
[51] Int. Cl. .................... H01s 3/02, H01s 3/22
[58] Field of Search.................. 331/94.5; 330/4.3; 313/201, 204

[56] References Cited
UNITED STATES PATENTS
3,562,662  2/1971  Gould et al. ..................... 331/94.5
3,613,027  10/1971  Westermeir........................ 331/94.5

Primary Examiner—Ronald L. Wibert
Assistant Examiner—R. J. Webster
Attorney, Agent, or Firm—Limbach, Limbach and Sutton

[57] ABSTRACT

A gaseous laser wherein the cylindrical cathode is utilized to form the plasma tube envelope and wherein the cathode is also utilized as a support for the laser optical resonator.

22 Claims, 8 Drawing Figures

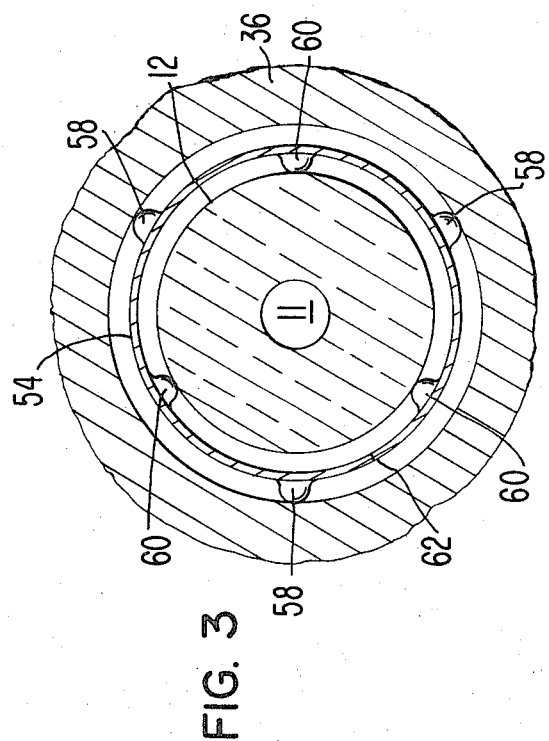
FIG. 6
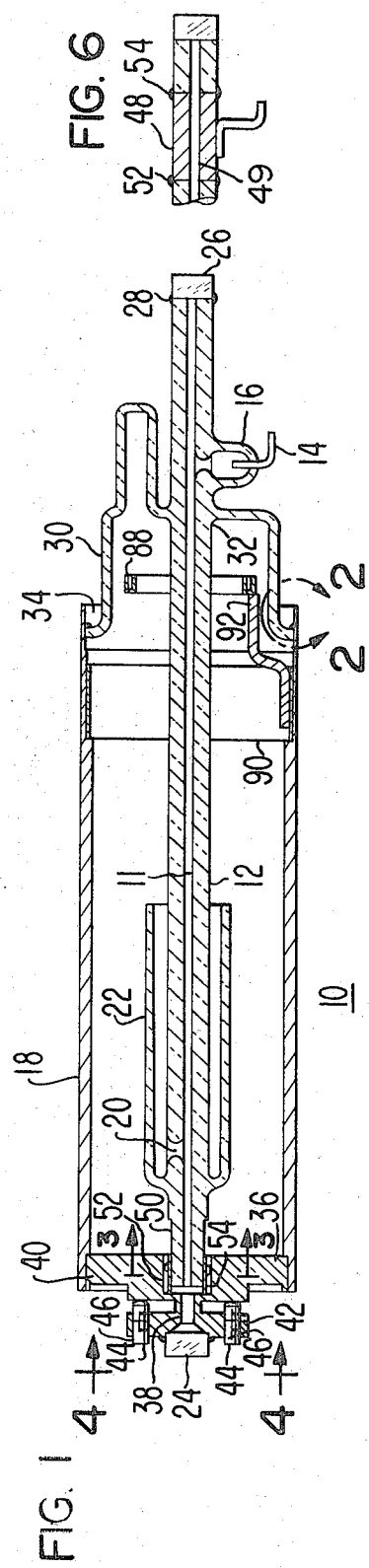
FIG. 1
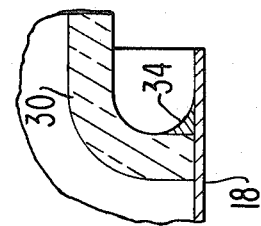
FIG. 2
FIG. 3

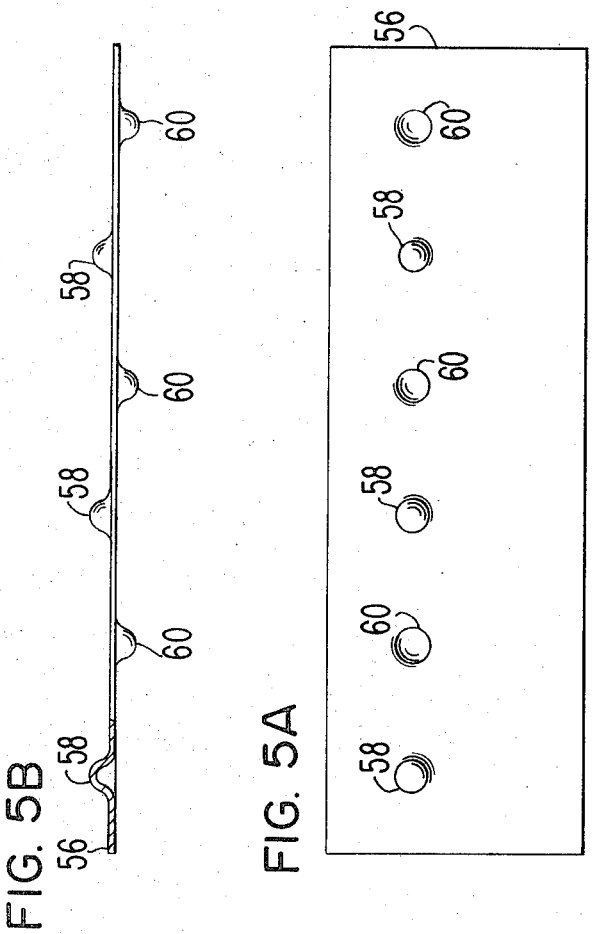
FIG. 4
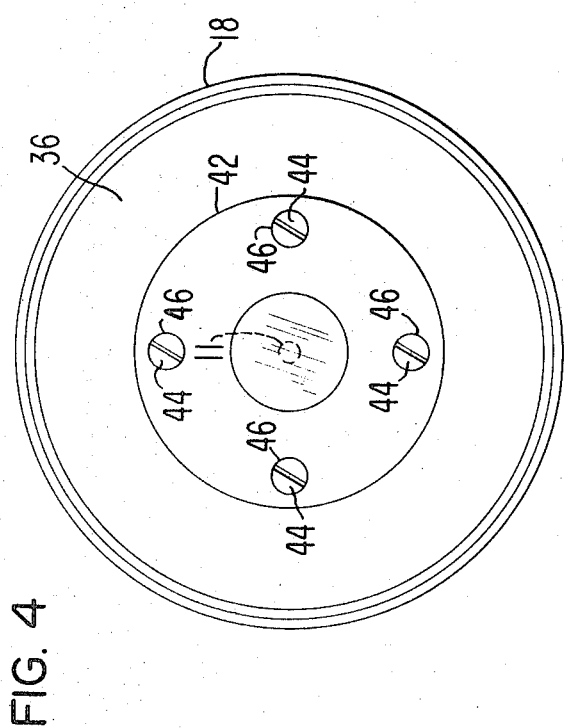
FIG. 5B
FIG. 5A
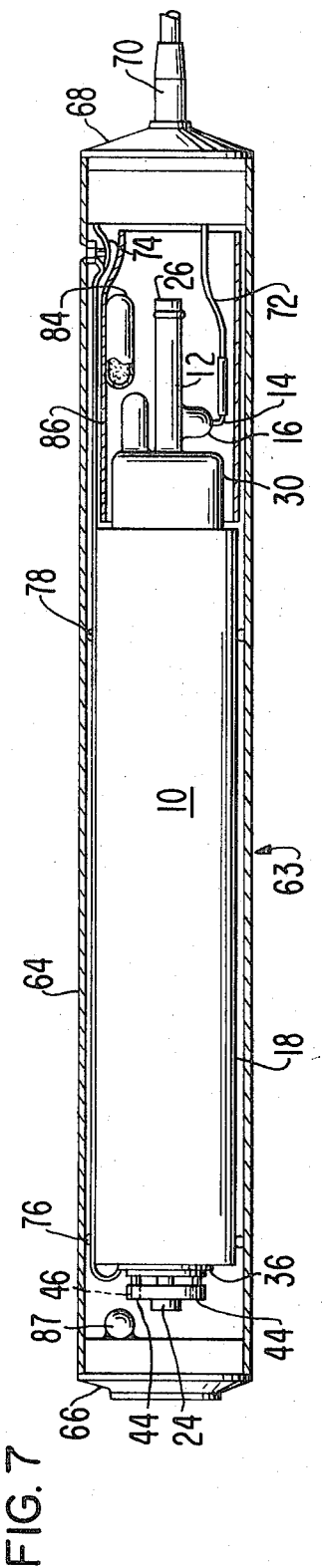
FIG. 7

GASEOUS LASER WITH CATHODE FORMING OPTICAL RESONATOR SUPPORT AND PLASMA TUBE ENVELOPE

BACKGROUND OF THE INVENTION

The present invention relates to lasers and, in particular, to an improved gaseous laser.

Although lasers and their principle of operation constitute an entirely new and exciting area of technology, in actual practice, laser fabrication, at least in the area of gaseous laser fabrication, has largely been little more than an outgrowth of electron tube manufacturing and fabrication techniques.

A gaseous laser includes a gas discharge or plasma tube containing the gaseous lasing medium. Within this discharge tube, typically, are one or more anodes, a cathode and a discharge-confining bore tube. The purpose of the bore tube is to concentrate the electrical discharge between the anode and the cathode with a relatively small volume and thereby increase the current density through the gaseous medium.

An optical resonator is axially aligned with the discharge-confining bore tube. The resonator includes one mirror or reflector which is totally reflecting and a second mirror or reflector which is sufficiently light transmissive to allow the emergence of an output light beam from the laser.

The optical resonator can be independent and external to the discharge tube or the mirrors forming the optical resonator can be made a part of the plasma tube envelope. In the latter case, the laser is said to have an internal optical resonator.

Cylindrical cathodes, co-axially aligned with and, in some cases, enclosing the bore tube, have been frequently employed in gaseous lasers. Prior art lasers, utilizing vacuum tube fabrication techniques enclose the cathode and the remainder of the discharge tube within an outer glass envelope. This envelope is substantially airtight and is responsible for containing the gaseous medium within the tube.

This type of construction has several disadvantages for a laser having an internal optical resonator. Typically, the resonator mirrors are mounted directly onto the outer ends of the glass envelope. Not only does this result in a less stable optical resonator design where thermal gradients are present, it also makes mirror adjustments very difficult.

This all-glass envelope construction also has several other important disadvantages. First, the glass construction makes the laser tube very fragile. Secondly, special provision must be made to permit electrical lead wires to pass through the envelope to the anode and cathode. Third, glass fabrication techniques are expensive and require skilled personnel.

SUMMARY OF THE INVENTION

It is therefore an object of the present invention to provide an improved gaseous laser.

Another object of the present invention is to provide an improved gaseous laser which does not require the use of an outer glass plasma tube envelope.

Another object of the invention is to provide a laser which is both rugged and durable.

Another object of the invention is to provide a laser having an internal optical resonator which is stable and less susceptible to thermal gradients than previous designs, and is easily adjusted.

Another object of the invention is to provide a laser which utilizes inexpensive capillary tubing for the discharge-confining bore tube.

Another object of the invention is to provide a laser having improved glass-to-metal seals.

In accordance with the present invention, the cylindrical cathode is utilized both as a part of the plasma tube envelope and as a support for the optical resonator.

Thus, rather than using a glass envelope for containing the electrical discharge and the gaseous laser medium, the cathode itself serves as a part of the discharge tube envelope. The remaining parts of the envelope are then either cemented or welded to the cathode or to each other.

By utilizing the cathode as a support for the optical resonator, greater stability is provided to the optical resonator. The cathode, made of a material having a high ratio of thermal conductivity to thermal expansion, such as aluminum, insures greater angular stability against warpage caused by temperature gradients within and across the laser.

Eliminating the outer glass envelope of conventional gaseous lasers and utilizing the metallic cathode as the external laser tube surface increases both the strength and durability of the laser. Since the ratio of the thermal conductivity to the thermal expansion of aluminum is larger than for glass, the design of the present invention is more desirable from a thermal standpoint than the previous design.

Since the cathode forms the external surface of the laser, the electrical contact to the cathode can be made directly without the requirement that the contact go through an outer glass envelope.

With the greater stability provided by the utilization of the metallic cathode as a support for the optical resonator, it is possible to use longer radius spherical mirrors as a part of the optical resonator. This means that greater output powers are possible.

In accordance with another aspect of the invention, the central aperture of the cylindrical cathode is utilized to define, at least in part, the transverse mode of the laser. Alternately, where the anode is cylindrical and co-axially aligned with the discharge bore tube, the central aperture of the anode is utilized for this purpose. As a result, inexpensive capillary tubing can be utilized for the bore tube since it is not a requirement, then, that the bore tube define the mode-determining aperture.

BRIEF DESCRIPTION OF THE DRAWINGS

FIG. 1 is a longitudinal cross-sectional view of an improved gaseous laser tube in accordance with the invention.

FIG. 2 is an enlarged view of a glass-to-metal seal of the laser tube of FIG. 1.

FIG. 3 is a cross-sectional view of the dischargeconfining bore tube of FIG. 1 taken in a direction indicated by the arrows in FIG. 1.

FIG. 4 is an end view of the laser tube of FIG. 1.

FIGS. 5A and 5B are, respectively, a side view and top view of the discharge-confining bore tube retainer of FIG. 1.

FIG. 6 is an alternative anode arrangement for the laser tube of FIG. 1.

FIG. 7 is a cross-sectional view of the laser of FIG. 1 and a laser tube enclosure having means for reducing water permeation into the laser tube.

DESCRIPTION OF THE PREFERRED EMBODIMENT

A gaseous laser tube 10 in accordance with the present invention is illustrated in FIG. 1. A gas or a mixture of gases is enclosed within the laser tube 10. The gaseous medium is excited within a discharge passage 11 of a discharge-confining bore tube 12 in a manner well known to those skilled in the laser art. The discharge-confining bore tube 12 is made from a suitable non-electrical conducting material such as pyrex or quartz.

Located near one end of the boretube 12 is an anode 14 situated in an anode well 16 forming a part of the bore tube 12. Although in the embodiment described only one such anode is shown, additional anodes can be utilized at other locations along the bore tube 12.

An elongated cylindrical cathode 18 is co-axially aligned with and surrounds a substantial length of the bore tube 12. Thus, an electrical discharge path exists beginning at the anode 14 and extending through and along the bore tube passage 11, through an exit port 20 in the bore tube 12, past the outer periphery of an umbrella member 22, and finally to the cathode 18. The purpose of the umbrella member 22 is to prevent the electrical discharge current from impinging upon only a single area of the cathode near one end thereof.

A pair of optical resonator mirrors 24 and 26 are axially aligned with the bore tube 12. The mirrors 24 and 26 form a part of the laser tube 10. That is, mirrors 24 and 26 are in direct communication with the gaseous medium within laser tube 10. Consequently, laser tube 10 itself is a plasma discharge tube, and mirrors 24 and 26 form a part of the envelope thereof.

Mirror 26 is mounted directly to one end of the bore tube 12. Prior to mounting, the end of bore 12 is ground flat and normal to its longitudinal axis. The mirror 26 is mounted to the end of the bore tube 12 by an organic sealant 28, such as epoxy. In one actual embodiment, an epoxy having the tradename "glasshesive" manufactured by Adhesive Engineering Co. and designated their type No. 2060 is utilized.

Cold cathode 18 forms a part of the plasma tube envelope confining the gaseous laser medium within the laser 10 and, as will be explained in greater detail subsequently, additionally performs the function of a support for the optical resonator of laser tube 10.

Cathode 18 is made of a suitable cathode material such as aluminum. Aluminum is particularly desirable since it is both sturdy and durable, and light weight. A generally cylindrical cup or cover 30 extends from one end 32 of the cathode 18 to the bore tube 12 where it is joined at 32. Cover 30 also forms part of the plasma tube envelope. In the embodiment described, cover 30 is fabricated as an integral part of the bore tube 12.

To insure that the gaseous medium is contained within the laser 10, the cover 30 must be suitably secured and sealed with the periphery of cathode 18. Details of this seal are illustrated in FIG. 2. The junction between the glass cover 30 and the alumiuum cathode 18 is sealed by a suitable organic sealant 34 such as the epoxy tradenamed "Scotch Weld" manufactured by the 3M Co. and designated their type No. 2214 (Hi-Temp). This seal 34 extends circumferentially around the entire junction between these two parts. This type of epoxy is a high temperature, low vapor pressure cement. Since the strength of the glass forming the cup 30 increases when compressive forces are applied, the glass is put into compression when the cement seal 34 is made. This is accomplished by curing the cement 34 at a higher temperature than is experienced normally during the actual operation of laser 10. This insures a structurally strong, reliable and vacuum-tight seal.

To form an additional part of the discharge tube envelope and to support mirror 24, a base member or cap 36 is provided. Cap 36 has a central aperture 38 which is axially aligned with the discharge path 11 of the bore tube 12. The peripheral of flange portion 40 of the cap 36 is secured to form a vacuum-tight seal with the cathode 18. In the embodiment illustrated, the cap 36 is also aluminum and is welded to the aluminum cathode 18 by conventional means.

In order for the laser to operate properly, optical resonator mirrors 24 and 26 must be parallel with respect to one another. To allow for slight errors in machining and fabrication, mirror 24 is made adjustable. A mirror support plate or disc 42 forms a part of the cap 36. It is spaced-apart and generally parallel with the flange portion 40 of cap 36. The mirror 24 is mounted to the plate 42 by an organic sealant such as the epoxy "glasshesive" referred to above. The mirror 24 covers the central aperture 38 and completes the plasma tube envelope.

Referring additionally to FIG. 4, four adjusting screws 44 extend through peripheral bores 46 provided in disc 42 and into engagement with the base member cap 36. If the laser needs further adjustment to obtain the maximum power, mirror 24 can be easily adjusted by means of the four screws 44. With this arrangement, flexing of the aluminum end member 36 and not the entire bore tube 12 is required to adjust the internal resonator mirror 24 relative to mirror 26.

Thus, it can be seen that not only does the cathode 18 along with the cathode cap 36 form a part of the laser envelope, but cathode 18 also serves to support the mirror 24. Not only does this eliminate the requirement of having to have a separate glass plasma tube envelope, it also provides a more stable support for the optical resonator of laser 10 than in previous designs.

In the present embodiment, the optical resonator is a hemispherical cavity resonator. Mirror 26 comprises a flat reflector which is substantially totally light reflecting. Mirror 24 is a spherical mirror having a 30 cm. radius of curvature. However, it should be understood that the position of these mirrors are interchangeable, i.e. the flat reflector 26 could be switched with the spherical mirror 24.

In order for the laser to oscillate reliably in the lowest transverse order mode, the limiting aperture of the discharge must be precisely controlled within the optical resonator. Thus, the inside diameter of the bore 12 can be used as the mode limiting aperture. However, it has been found that the central aperture 38 of the cathode cap 36 can be utilized to define the mode-limiting aperture. This has the advantage of enabling the bore tube 12 to be made of standard capillary tubing to confine the gas discharge, rather than requiring that the bore tube 12 be manufactured to close inside diameter tolerances to define the limiting aperture.

An alternative anode arrangement is shown in FIG. 6. Anode 14 located in the well 16 of FIG. 1 is replaced by a cylindrical anode 48 having a central aperture 49. Anode 48 is axially aligned with and bonded onto the bore tube 12 at 52 and 54 by suitable bonding means such as an organic sealant, e.g., epoxy. Here again, the diameter of the central aperture 50 can be utilized to determine the transverse mode of the laser 10. Thus, this arrangement is an alternative to the use of the aperture 38 of the cathode cap 36 to define the limiting aperture.

The light reflected between mirrors 24 and 26 defines a generally truncated cone of light, with the largest diameter being near the spherical mirror and the smallest diameter at the flat mirror. Thus, as a practical matter it is best to situate the spherical mirror near the anode, cathode, or that part of the bore tube 12 which defines the limiting aperture.

Cathode cap 36, in combination with cathode 18, being made of aluminum, has a different thermal coefficient of expansion than the bore tube 12, made of glass. Consequently, provision must be made to allow relative movement between these two parts. End 50 of bore tube 12 fits into a female receiving cavity 52 in the cathode cap 36. The end 50 is free to move axially relative to the cathode cap 36.

To maintain the bore 12 in proper axial alignment with the central aperture 38, a retaining member 54 is provided. Additional reference is made to FIGS. 3, 5A and 5B. Retainer 54 is constructed from a flat stainless steel rectangular piece 56. Located longitudinally along the rectangular piece 56 are a series of protuberances. Alternate protuberances 58 extend in one direction from the plate 56 and the remaining protuberances 60 extend in the opposite direction. The retainer 54 is made into a cylindrical shape by curving plate 56 until opposite ends of the plate meet to form a seam 62. The completed retainer 54 is then placed around the end 50 of the bore 12 prior to the insertion of the cathode cap 36.

An annular getter is mounted to a stainless steel annular member 90 by a support member 92. The strip 90 is spring fitted into cathode 18. During the fabrication of the laser, the getter 88 is heated so as to deposit a thin film around the inside surface of cover 30. This thin film absorbs unwanted gases which result from impurities within the gas mixture and from cathode sputtering. The getter may be made from a suitable material such as barium.

As explained above, both of the mirrors 24 and 26 are joined to the gas containing envelope by means of an organic sealant. Similarly, the cathode 18 is joined to the glass cup 30 by means of an organic seal 34. Water permeation through these organic sealants poses a problem since water vapor with the tube 10 is detrimental to the operation of the laser.

A technique for overcoming this problem is shown in FIG. 7. Laser tube 10 is enclosed within an exterior housing assembly 63 which includes a tubular housing member 64. Tubular housing member 64 may be made of any suitable material which is both rugged, lightweight and airtight, such as aluminum. A front end cap 66 and a back end cap 68 complete the housing assembly 63. Although the end caps 66 and 68 can be made of the same material as the housing tube 64, it is not necessary to weld these pieces to the tube 64. In fact, they can be mounted to the tube 64 by an organic sealant such as the epoxy "glasshesive" referred to above. End cap 68 is provided with a cable 70 through which the anode lead 72 and a cathode lead 74 pass.

The laser tube 10 is supported within the housing tube 64 by a pair of O-rings 76 and 78. These O-rings serve several functions including the absorption of mechanical vibrations which would otherwise be transmitted from the housing assembly 63 to the tube 10.

Capsule 84 contains a water vapor-absorbing desiccant. The capsule is suitably mounted to a mylar sleeve 86. The mylar sleeve 86 additionally serves to insulate the anode 14 from the aluminum housing tube 84. Similarly, a second capsule 87 containing a water vapor-absorbing desiccant is mounted at the opposite end of the housing assembly 83. A suitable desiccant for both of the capsules is silica-gel.

The housing assembly 83 prevents most water vapor amounts from entering within the regions surrounding the laser tube 10. What water vapor does penetrate the seals between the end caps 66 and 68 and the housing tube 64 is absorbed by the desiccant. The desiccant has been found to keep the water vapor pressure to $28 \times 10^{-3}$ torr or less near the tube 10. this partial pressure of water vapor is a tolerable value for the various organic seals of the laser tube 10 to be exposed to.

In one actual embodiment of the laser tube 10, the length of the bore tube 12 is 256 mm., the ouside diameter of the bore tube 12 is 7 mm. and, with the bore tube 12 defining the limiting aperture for purposes of mode determination, its inside diameter is 0.061 in. In that laser the gaseous medium is a combination of helium and neon at pressures of 3.1 torr and 0.4 torr respectively. The output wavelength of the laser is at 6328 A (red).

If a polarized beam is desired from laser 10, brewster angle windows can easily be incorporated into the present design. For example, mirror 24 can be replaced by an elongated aluminum tube which is welded onto the cathode cap 36. A glass plate at Brewster's angle is mounted within the tube and the mirror 24 is secured to the end of the aluminum tube extension.

In the embodiment illustrated, only a single reflector is supported by the cathode 18. However, where greater stability is desired or required, both resonator reflectors can be supported by the cathode 18.

Since the cathode 18 is not insulated by a glass envelope as in previous laser designs, from the standpoint of safety, it is desirable to have the cathode at ground potential, and the anode at a positive potential.

Although the laser tube described herein utilizes only a single anode, additional anodes can be provided along the bore tube if desired.

We claim:
1. A gaseous laser comprising:
   a. a bore tube;
   b. optical resonator means axially aligned with at least a part of said bore tube to form the optical beam path of the laser and for stimulating the emission of radiation along said path;
   c. at least one anode near an end of said bore tube;
   d. a gaseous laser medium;
   e. an elongated cylindrical cold cathode coaxially aligned with and surrounding a substantial part of said bore tube, said cathode and anode forming an electrical discharge path therebetween through said bore tube;

f. means for forming a population inversion in said gaseous laser medium by means of an electrical discharge between said anode and said cathode; and g. means for utilizing said cathode to form a substantially air-tight envelope enclosing said gaseous laser medium, with said cathode forming the major portion of said envelope, including
first means for terminating one end of said cathode to form an air-tight seal with said bore tube, and
second means for terminating the opposite end of said cylindrical cathode, said terminating means including means for permitting the passage therethrough of light reflected within said optical resonator.

2. A laser as in claim 1 wherein said first terminating means comprises a generally cylindrical cover extending between said cathode and said bore tube.

3. A laser as in claim 2 wherein said cover is glass, said cathode is metallic, and means for bonding said cover to said cathode by an organic cement while said glass cover is in compression.

4. A laser as in claim 2 wherein said cover is glass.

5. A laser as in claim 4 wherein said cover is bonded to said cathode by an organic sealant.

6. A laser as in claim 1 wherein said resonator comprises first and second reflectors axially aligned with at least a part of said bore tube, one of said reflectors being substantially totally light reflecting and said other reflector being partially light transmissive and wherein said second terminating means supports at least one of said reflectors.

7. A laser as in claim 6 wherein the dimensions of said central bore determines at least in part the transverse mode of the laser.

8. A laser as in claim 6 wherein second terminating means includes a cap having a central bore therethrough aligned with said bore tube and wherein said first reflector is mounted to said cap to cover said central bore thereof.

9. A laser as in claim 8 wherein said cap is metallic and forms an integral part of said cathode.

10. A laser as in claim 8 wherein said first terminating means comprises a generally cylindrical cover extending between said cathode and said capillary bore tube.

11. A laser as in claim 10 wherein said second reflector is mounted to cover said bore tube at the anode end thereof.

12. A laser as in claim 11 wherein said first and second mirrors are bonded by an organic sealant.

13. A laser as in claim 1 wherein said anode is cylindrical and is coaxially aligned with and supported by said bore tube and wherein the inside diameter of said anode determines the transverse mode of the laser.

14. A laser as in claim 1 wherein said cathode is aluminum.

15. A gaseous laser comprising:
a. a bore tube;
b. at least one anode situated near an end of said bore tube;
c. a laser tube envelope;
d. a gaseous laser medium enclosed within said laser tube envelope;
e. a cylindrical elongated cold metallic cathode which forms the major portion of said tube envelope and which extends over the major portion of said envelope surrounding said bore;
f. means for creating an electrical discharge between said cathode and said anode through said bore tube to form a population inversion in said gaseous laser medium;
g. a pair of mirrors axially aligned with each other and with at least a part of said bore tube, one of said mirrors being substantially totally light reflecting and the other mirror being partially light transmissive to form the optical beam path of the laser and for stimulating the emission of radiation along said path; and
h. means for supporting at least one of said mirrors by said cathode.

16. A laser as in claim 15 wherein said support meams comprises a cap having a central aperture secured to an end of said cathode and means for mounting one of said mirrors to cover said central aperture.

17. A laser as in claim 16 wherein said cap is welded to said cathode.

18. A laser as in claim 16 wherein the dimensions of said central aperture determines at least in part the transverse mode of the laser.

19. A laser as in claim 16 wherein the other of said mirrors is mounted to and supported by an end of said bore tube.

20. A laser as in claim 19 wherein said first and second mirrors are mounted by an organic cement.

21. A laser as in claim 15 wherein said anode is cylindrical and is coaxially aligned with and supported by said discharge-confining bore tube and wherein the inside diameter of said anode determines the transverse mode of the laser.

22. A laser as in claim 15 wherein said cathode is aluminum.

* * * * *

UNITED STATES PATENT OFFICE
CERTIFICATE OF CORRECTION

Patent No. 3,851,272      Dated Nov. 26, 1974

Inventor(s) William A. Shull et al.

It is certified that error appears in the above-identified patent and that said Letters Patent are hereby corrected as shown below:

Column 6, line 17, "83" should be -- 63 --.

Claim 15, lines 15 and 16, delete "and which extends over the major portion of said envelope surrounding said bore".

Signed and sealed this 29th day of April 1975.

(SEAL)
Attest:

RUTH C. MASON
Attesting Officer

C. MARSHALL DANN
Commissioner of Patents
and Trademarks